Sept. 22, 1959  H. E. LIEBELT  2,905,075
BEVERAGE MAKER AND DISPENSER
Original Filed Dec. 15, 1951  2 Sheets-Sheet 1

INVENTOR.
HOWARD E. LIEBELT
BY
ATTORNEY

Sept. 22, 1959  H. E. LIEBELT  2,905,075
BEVERAGE MAKER AND DISPENSER
Original Filed Dec. 15, 1951  2 Sheets-Sheet 2

INVENTOR.
HOWARD E. LIEBELT
BY
ATTORNEY

United States Patent Office 2,905,075
Patented Sept. 22, 1959

2,905,075

BEVERAGE MAKER AND DISPENSER

Howard E. Liebelt, Norwood, Ohio

Original application December 15, 1951, Serial No. 261,872, now Patent No. 2,783,704, dated March 5, 1957. Divided and this application July 13, 1956, Serial No. 597,739

1 Claim. (Cl. 99—295)

This application is a division of my co-pending application Serial No. 261,872 filed December 15, 1951, which issued as Patent No. 2,783,704 on March 5, 1957.

This invention relates to a method of and means for preparing individual servings of beverage by passing fluid through a dispensible cartridge containing fluid-soluble ingredients.

An object of the invention is to provide a device for enabling a layman, or other person unskilled in the culinary arts, to prepare an individual serving of beverage by simply associating a cartridge containing fluid-soluble ingredients with a fluid dispensing device which may be manually actuated for discharging a quantity of fluid directly into the cartridge for thereby enabling the fluid to dissolve the fluid-soluble ingredients of the material contained within the cartridge.

Another object of the invention is to provide a cartridge for housing material containing fluid-soluble ingredients which is so constructed and arranged as to insure maximum turbulence of its contents incident to the passage of a fluid therethrough.

These and other objects are attained by the means described herein and as disclosed in the accompanying drawings, in which.

Figure 1:
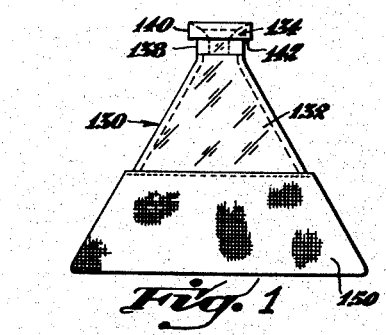
Fig. 1 is a side elevational view of a cartridge comprising a detail of the present invention.

Reference is made to my Patent No. 2,783,704 for a full description of a coffee-dispenser which includes a nozzle with which the subject cartridge is adapted to be associated for discharging fluid into the interior of a cartridge which contains a fluid-soluble material.

With reference to Figs. 1–4, the numeral 130 denotes generally a cartridge which includes a body portion 132 terminating in an upper portion 134 and a lower open bottom portion 136. The dimensional characteristics of upper portion 134 are such as to provide a neck 138 immediately below an enlarged bearing portion 140.

Figure 4:
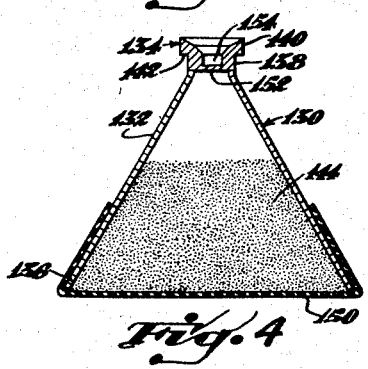
Fig. 4 is a vertical section through Fig. 1.

As best illustrated in Fig. 4, a quantity of fluid soluble material, indicated generally by the numeral 144, is housed within cartridge 130, being maintained therein by reason of a water pervious member 150. Preferably a membrane 152 spans top opening 154 of the cartridge, thereby effectively sealing the contents of the cartridge against the effects of atmospheric conditions.

The structural characteristics of all of the cartridges are preferably such as to agitate the material housed therein incident to a flow of fluid therethrough. In the cartridge illustrated in Figs. 1 through 4 the maximum diameter is from 100 to 175 percent of the height dimension, said maximum diameter being from 8 to 14 times the diameter of the upper portion at the neck.

In use, the neck of a cartridge is adapted to be associated with a fluid-dispensing nozzle, not illustrated, and in one embodiment of the invention the forward end of such a nozzle may be dimensioned to enter portion 154 of the cartridge whereby further moveemnt of the cartridge toward the nozzle will result in membrane 152 being ruptured, sheared or displaced thereby establishing open communication between the nozzle and the interior of cartridge 130 whereby fluid discharged through the nozzle will be discharged directly into the interior of the cartridge.

The flow of hot fluid into and through the cartridge will permit the fluid-soluble ingredients of material 144 to dissolve and enter into solution and thence be discharged through member 150 thence into a cup or other suitable container, not illustrated.

Figure 5:
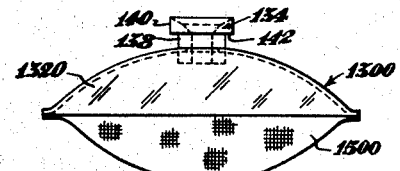
Fig. 5 is a side elevational view of a modified form of cartridge comprising a detail of the present invention.
Figure 2:
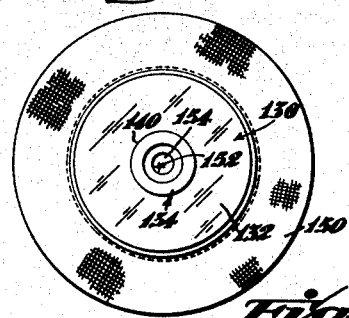
Fig. 2 is a top elevational view of Fig. 1.
Figure 6:
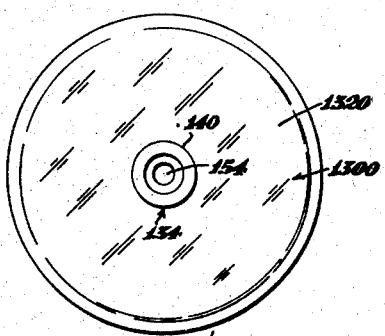
Fig. 6 is a top elevational view of Fig. 5.
Figure 3:
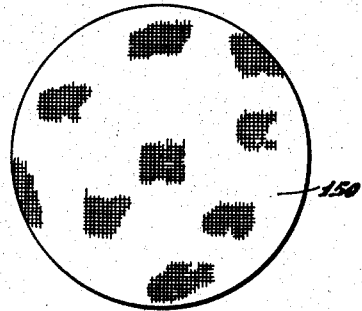
Fig. 3 is a bottom elevational view of Fig. 1.
Figure 7:
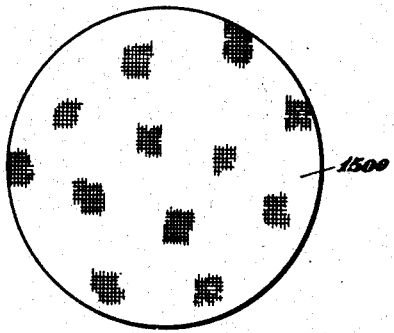
Fig. 7 is a bottom elevational view of Fig. 5.

In Figs. 5–7 I have illustrated a modified form of cartridge denoted generally by the numeral 1300 which comprises a body portion 1320 including an upper portion 134 similar to the upper portion of the cartridge illustrated in Figs. 1–4. A fluid pervious member 1500 is suitably associated with the lower peripheral edge of body 1320 for retaining fluid soluble material, thereby completing the cartridge assembly.

Figure 9:
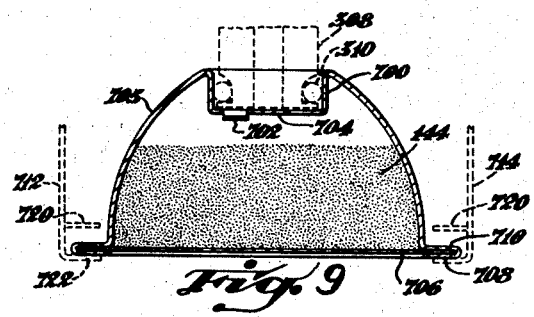
Fig. 9 is a vertical section through the cartridge of Fig. 8.
Figure 10:
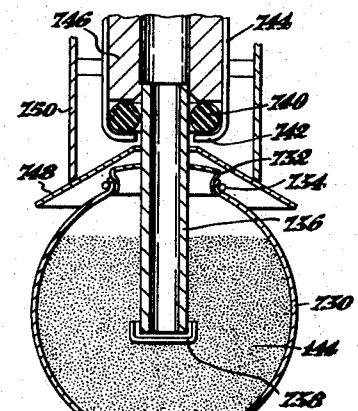
Fig. 10 is a vertical section through a modified form of cartridge operatively associated with a fluid discharging nozzle.
Figure 8:
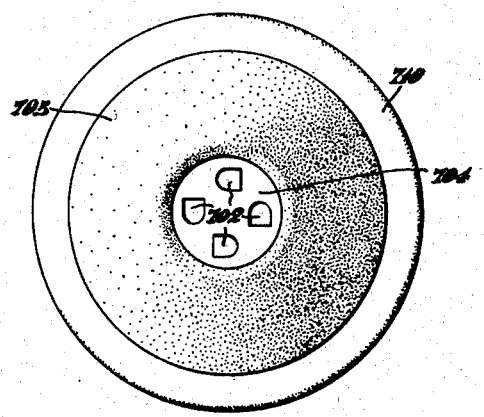
Fig. 8 is a top elevational view of another modification of cartridge.

In Figs. 9 and 10 I have illustrated a cartridge having an upper portion 700 dimensioned to engage an O-ring 310 of nozzle 308. Tabs 702 are provided in wall 704 for imparting a definite nozzle-action to fluid discharged into the interior of the cartridge.

If desired the body 705 of the cartridge may be dome-shaped and fabricated from any suitable material. A sheet of fluid pervious material 706 may be secured to and across the open bottom edge of the housing by any suitable means, such as, by way of example, an inturned lip 708 of a peripheral flange 710. This flange may be engaged by or received between a pair of spaced members 720 and 722 secured to and carried by each of a pair of reciprocably mounted cartridge carrier jaws 712 and 714.

In Fig. 10 the numeral 730 denotes a fluid pervious housing which is substantially bag-shaped with its upper end secured to a cap member 732 as at 734. A fluid conduit 736 is secured to and projects through the cap, terminating well within the housing in a deflector element 738. The opposite end of the conduit projects outwardly from cap 732 for insertion into an O-ring 740 carried by lips 742 of reciprocable plates 744. Upward movement of plates 744 will compress the O-ring against the free lower end of nozzle 746 and onto conduit 736 thereby providing a fluid tight connection between the cartridge and nozzle.

A shield 748 may be provided for guiding the upper end of conduit 736 into axial alignment with the nozzle and O-ring assembly, and by mounting the shield to plates 750 reciprocable with plates 744 automatic ejection of a cartridge may be expeditiously effected.

Figure 11:
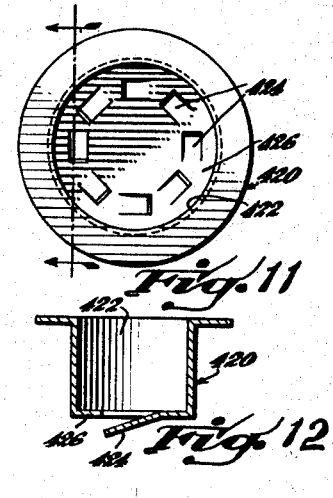
Fig. 11 is a top elevational view of the top, nozzle-engaging portion of a cartridge comprising a detail of the present invention.
Figure 12:
Fig. 12 is a sectional view taken on line 12—12 of Fig. 11.

In Figs. 11 and 12, I have illustrated another modification of cartridge which has been constructed in such a manner as to insure thorough wetting and agitation of the material housed within the cartridge. With particular reference to Figs. 11 and 12, the numeral 420 denotes a cap including an inner annular wall 422 dimensioned to make snug fit with suitable sealing means secured to and carried by the fluid discharge O-ring 310 nozzle for effecting a fluid-tight fit between the nozzle and the cartridge. Preferably a plurality of tabs 424 are struck from the cap bottom 426 for imparting a definite tangential nozzle-action to fluid discharged via the nozzle into the interior of cartridge 412, for circumferentially swirling, and thoroughly wetting the contents of the cartridge incident to passage of fluid therethrough.

From the foregoing it will be noted that I have provided simple yet highly effective means for attaining the stated objects.

It should be understood that various changes in the structural details of the device may be made, within the scope of the appended claim, without departing from the spirit of the invention.

What is claimed is:

A cartridge for use with beverage-dispensing apparatus, said apparatus including a nozzle, and in combination, said cartridge comprising a reduced neck portion having a fluid passage engageable with said nozzle, an enlarged body portion connected to the passage and the upper part of which flares radially outwardly from said neck portion, said body portion having a fluid-pervious bottom and being conformed to contain a bed of fluid-soluble ingredients having a maximum diameter which is greater than its maximum depth, and a septum across the neck portion, said septum having perforations formed by downwardly punched tabs arranged in a circular pattern so as to cause fluid from the nozzle to swirl circumferentially in the cartridge.

References Cited in the file of this patent

UNITED STATES PATENTS

| | | |
|---|---|---|
| 222,109 | West | Nov. 25, 1879 |
| 726,793 | Bezzera | Apr. 28, 1903 |
| 912,634 | Warburton | Feb. 16, 1909 |
| 1,075,727 | Reichert | Oct. 14, 1913 |
| 1,377,316 | Clermont | May 10, 1921 |
| 2,263,610 | Cain | Nov. 25, 1941 |
| 2,484,054 | Sharp | Oct. 11, 1949 |
| 2,539,708 | Swanson | Jan. 30, 1951 |
| 2,567,027 | Peters | Sept. 4, 1951 |
| 2,589,783 | Crossley et al. | Mar. 18, 1952 |
| 2,637,266 | Grado | May 5, 1953 |
| 2,638,839 | Raiteri | May 19, 1953 |

FOREIGN PATENTS

| | | |
|---|---|---|
| 1,823 | Germany | Jan. 19, 1878 |
| 366,022 | Germany | Dec. 28, 1922 |